United States Patent
Berjot et al.

(10) Patent No.: US 11,319,082 B2
(45) Date of Patent: May 3, 2022

(54) AIRCRAFT ASSEMBLY COMPRISING A MOUNTING PYLON, A WING AND TWO FIXING SYSTEMS FIXING THE MOUNTING PYLON TO THE WING

(71) Applicant: Airbus Operations SAS, Toulouse (FR)

(72) Inventors: Michael Berjot, Colomiers (FR); Isabelle Petrissans, Cugnaux (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 281 days.

(21) Appl. No.: 16/791,094

(22) Filed: Feb. 14, 2020

(65) Prior Publication Data
US 2020/0262571 A1  Aug. 20, 2020

(30) Foreign Application Priority Data
Feb. 18, 2019  (FR) ........................................ 1901613

(51) Int. Cl.
*B64D 27/26* (2006.01)
*B64D 27/18* (2006.01)

(52) U.S. Cl.
CPC .............. *B64D 27/26* (2013.01); *B64D 27/18* (2013.01); *B64D 2027/264* (2013.01); *B64D 2027/266* (2013.01)

(58) Field of Classification Search
CPC .. B64D 27/26; B64D 27/18; B64D 2027/264; B64D 2027/266; B64C 3/32; B64C 3/182
See application file for complete search history.

(56) References Cited

U.S. PATENT DOCUMENTS

| | | | | |
|---|---|---|---|---|
| 2008/0217502 A1* | 9/2008 | Lafont | .................. | B64D 27/26 248/554 |
| 2010/0133376 A1* | 6/2010 | Foyer | ..................... | B64D 27/26 244/54 |
| 2010/0147997 A1* | 6/2010 | Martinou | ............... | B64D 27/26 244/54 |
| 2012/0234970 A1* | 9/2012 | Marche | .................. | B64D 27/26 244/54 |

FOREIGN PATENT DOCUMENTS

| | | |
|---|---|---|
| EP | 2500268 A1 | 9/2012 |
| WO | 2008132077 A1 | 11/2008 |
| WO | 2008142098 A1 | 11/2008 |

OTHER PUBLICATIONS

French Search Report; priority document.

* cited by examiner

*Primary Examiner* — Richard R. Green
*Assistant Examiner* — Steven J Shur
(74) *Attorney, Agent, or Firm* — Greer, Burns & Crain, Ltd.

(57) ABSTRACT

An assembly comprising a wing with lower spars, a mounting pylon having an upper spar and two lateral panels, a front fixing system and a rear fixing system, each comprising a beam pierced with a principal bore and, for each beam, an upper bore traversing the upper spar and a shear pin positioned in the upper bore and in the principal bore. The assembly also comprises, for each fixing system, bolts, the nut of which is accommodated in a secondary hole of the beam and the screw of which traverses the upper spar and the beam in order to be screwed into the nut.

5 Claims, 4 Drawing Sheets

AIRCRAFT ASSEMBLY COMPRISING A MOUNTING PYLON, A WING AND TWO FIXING SYSTEMS FIXING THE MOUNTING PYLON TO THE WING

CROSS-REFERENCES TO RELATED APPLICATIONS

This application claims the benefit of the French patent application No. 1901613 filed on Feb. 18, 2019, the entire disclosures of which are incorporated herein by way of reference.

FIELD OF THE INVENTION

The present invention relates to an aircraft assembly, wherein said assembly comprises a mounting pylon, a wing and two fixing systems fixing the mounting pylon to the wing, and also to an aircraft comprising at least one such assembly.

BACKGROUND OF THE INVENTION

On existing aircraft, the engines, such as turbojets, are suspended below the wings by means of complex mounting devices also known as "EMSs" (Engine Mounting Structures), or, alternatively, mounting pylons. The mounting pylons customarily used have a primary structure, also called a rigid structure, often produced in the form of a box, i.e., produced by the assembly of lower and upper spars connected together by a plurality of transverse reinforcement ribs located inside the box and at the ends thereof. The spars are arranged as lower and upper faces, whilst lateral panels close the box as lateral faces. Moreover, the mounting pylon is arranged in the upper part of the engine, between the latter and the wing box. This clock position is known as "12 o'clock."

In a known manner, the primary structure of these pylons is designed to allow the transmission to the wing of the static and dynamic forces generated by the engines, such as weight and thrust, or, alternatively, the various dynamic forces, notably in the event of dynamic landing, etc.

In known prior-art mounting pylons, forces between the primary structure thereof and the wing box are conventionally transmitted by a set of attachments comprising a front attachment, a rear attachment and also an intermediate attachment, the latter being notably designed to take up the thrust forces generated by the engine. These attachments are conventionally interposed vertically between the wing box and the primary structure of the mounting pylon.

On recent engines, the diameter is increasingly great.

Consequently, with a ground clearance determined such as to remain acceptable from the safety standpoint, the space left between the wing element and the engine is increasingly restricted. Thus, it becomes difficult to fit the mounting pylon and also the various wing attachments in this remaining vertical space, which is usually set aside for this fitting. This difficulty is all the greater when the forces that are passing through are likewise high in intensity and require the wing box and the primary structure to be appropriately dimensioned. Indeed, these latter have to be of sufficient dimensions to afford a mechanical strength capable of withstanding the passage of forces from the engine towards the wing element, with low deformation under load stress, with a view to not degrading the aerodynamic performance levels of the propulsion system.

In the prior art, multiple solutions have been proposed to bring the engine as close as possible to the wing element from which it is suspended, with a view to preserving the required ground clearance.

Nevertheless, these solutions need to be improved on a continual basis in order to adapt to increasingly greater fan diameters that are adopted in order to meet bypass rate requirements.

SUMMARY OF THE INVENTION

An object of the present invention is to propose an aircraft assembly that comprises a mounting pylon, a wing and two fixing systems fixing the mounting pylon to the wing, wherein the two fixing systems are compact.

To that end, an assembly for an aircraft is proposed, said assembly comprising:

a wing comprising lower spars, a mounting pylon arranged under the wing and comprising a primary structure in the form of a primary box having an upper spar and two lateral panels arranged symmetrically on either side of a median plane XZ, a front fixing system comprising:

a front beam fixed to the lower spar, wherein the front beam is pierced with a principal front bore oriented vertically, wherein the front beam is pierced with two secondary front holes oriented parallel to a longitudinal direction X and arranged symmetrically on either side of the median plane XZ, wherein from each secondary front hole there extends at least one front through-passage oriented vertically, an upper front bore traversing the upper spar and oriented vertically and coaxial with the principal front bore, a front shear pin positioned in the upper front bore and in the principal front bore, for each front through-passage, a secondary front bore traversing the upper spar and oriented vertically and coaxial with the front through-passage, two brackets arranged symmetrically on either side of the median plane XZ, wherein each bracket comprises a base and a blade integral with the base, wherein the base has an upper face applied under the upper spar, wherein for each front through-passage the base is pierced with a hole traversing same and oriented vertically, and wherein each hole opens out at the upper face and is coaxial with the front through-passage, wherein the blade is fixed against and on the outside of a lateral panel, and for each front through-passage, a front bolt with a nut accommodated in the secondary front hole and a screw that successively traverses the hole, the secondary bore and the front through-passage in order to be screwed into the nut, and a rear fixing system comprising:

a rear beam fixed to the lower spar, wherein the rear beam is pierced with a principal rear bore oriented vertically, wherein the rear beam is pierced with two secondary rear holes oriented parallel to the longitudinal direction X and arranged symmetrically on either side of the median plane XZ, wherein from each secondary rear hole there extends at least one rear through-passage oriented vertically, an upper rear bore that traverses the upper spar and oriented vertically and coaxial with the principal rear bore, a rear shear pin positioned in the upper rear bore and in the principal rear bore, for each rear through-passage, a secondary rear bore traversing the upper spar and oriented vertically and coaxial with the rear through-passage, for each rear through-passage, a rear bolt with a nut accommodated in the secondary rear hole and a screw that traverses successively the secondary rear bore and the rear through-passage in order to be screwed into the nut.

Such an assembly makes it possible to bring the mounting pylon as close as possible to the wing.

Advantageously, each secondary hole has a circular cross section and each nut has a D profile.

Advantageously, the primary structure comprises a rear closure rib, each secondary rear bore traverses the rear closure rib and the upper rear bore traverses the rear closure rib.

The invention also proposes an aircraft comprising at least one assembly as described hereinabove.

BRIEF DESCRIPTION OF THE DRAWINGS

The features of the invention that are mentioned above and also other features will become more clearly apparent on reading the following description of an exemplary embodiment, said description being given with reference to the appended drawings, in which.

DETAILED DESCRIPTION OF THE PREFERRED EMBODIMENTS

Figure 1:
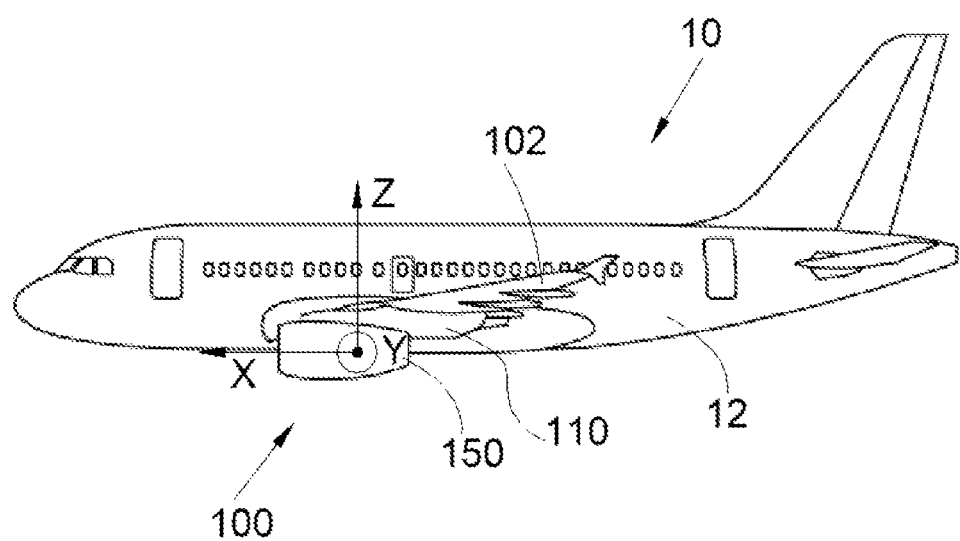
FIG. 1 shows a side view of an aircraft comprising an assembly according to the invention.

FIG. 1 shows an aircraft 10 comprising a fuselage 12 on which are fixed two wings 102 (only one being visible in FIG. 1), each wing 102 forming an integral part of an assembly 100 according to the invention.

The assembly 100 supports an engine 150, in particular a bypass twin-spool engine, such as a turbofan. The assembly 100 comprises not only the wing 102 but also a mounting pylon 110 arranged under the wing 102 and under which is suspended the engine 150 and which is interposed between the wing 102 and the engine 150.

In all the following description, and by convention, the direction X corresponds to the longitudinal direction of the assembly 100, which is likewise akin to the longitudinal direction of the engine 150, this longitudinal direction X being parallel to a longitudinal axis of the engine 150. Furthermore, the direction Y corresponds to the direction oriented transversely relative to the assembly 100, likewise akin to the transverse direction of the engine 150. Lastly, the direction Z corresponds to the vertical direction or height, these three directions X, Y and Z being orthogonal relative to one another.

The terms "front" and "rear" are to be considered relative to a direction of forward movement of the aircraft 10 created as a result of the thrust exerted by the engines 150, this direction being globally oriented in the longitudinal direction X.

Figure 2:
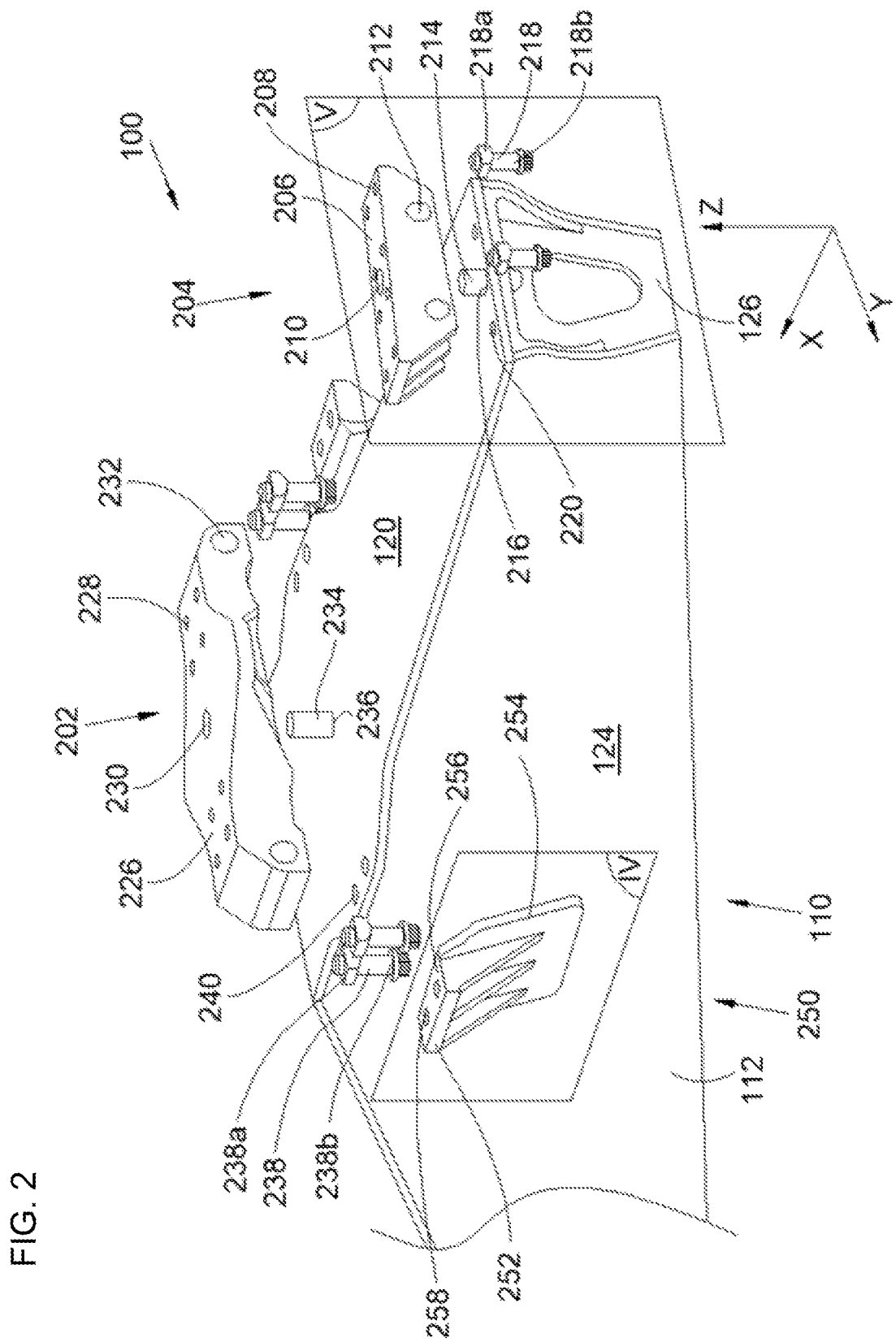
FIG. 2 shows an expanded perspective view of an assembly according to the invention.

FIG. 2 shows the assembly 100 without the wing 102 under which the engine 150 is suspended.

Figure 3:
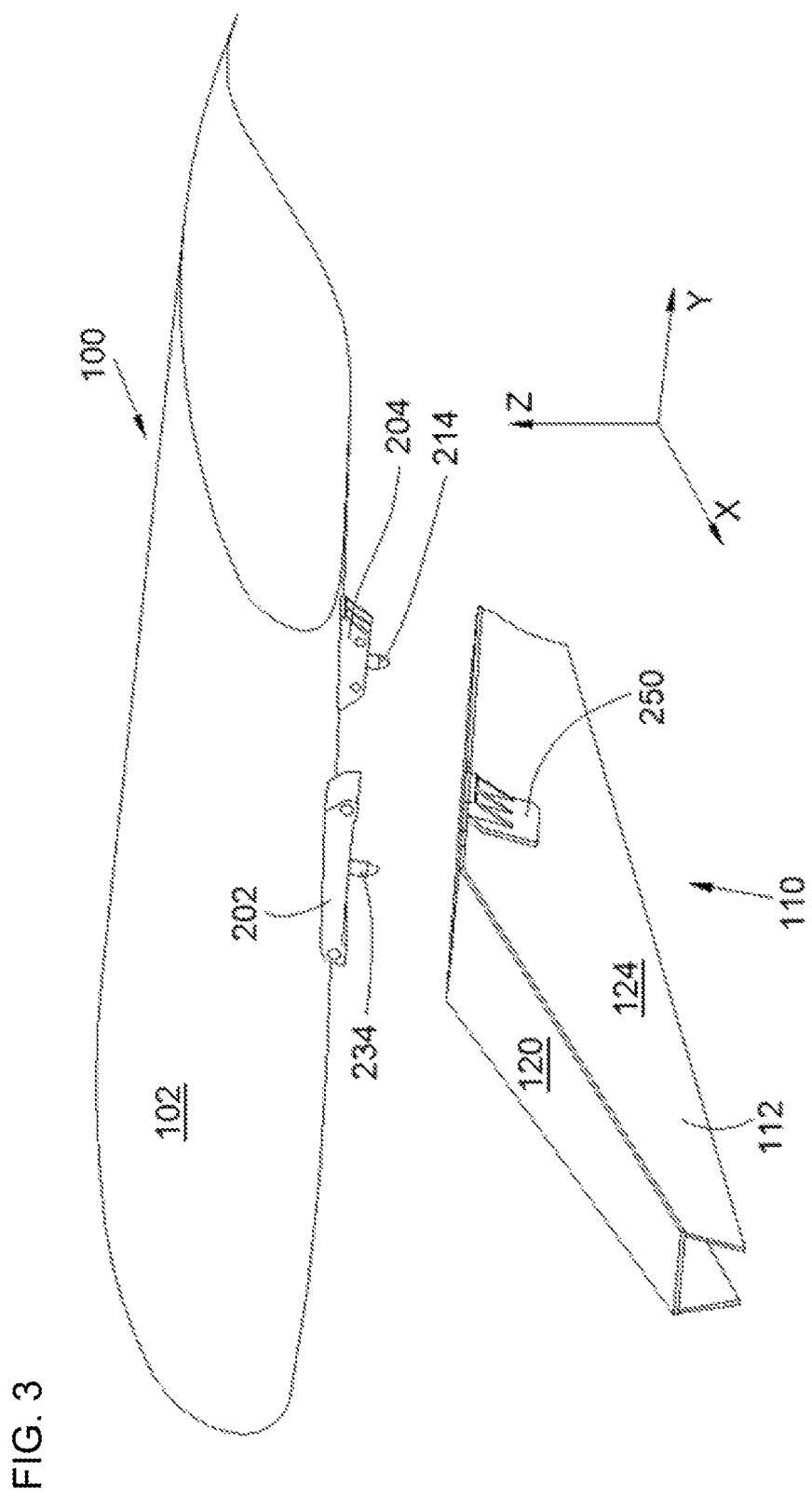
FIG. 3 shows a perspective view of the assembly according to the invention in the assembly phase.

FIG. 3 shows the assembly 100 during assembly.

Figure 4:
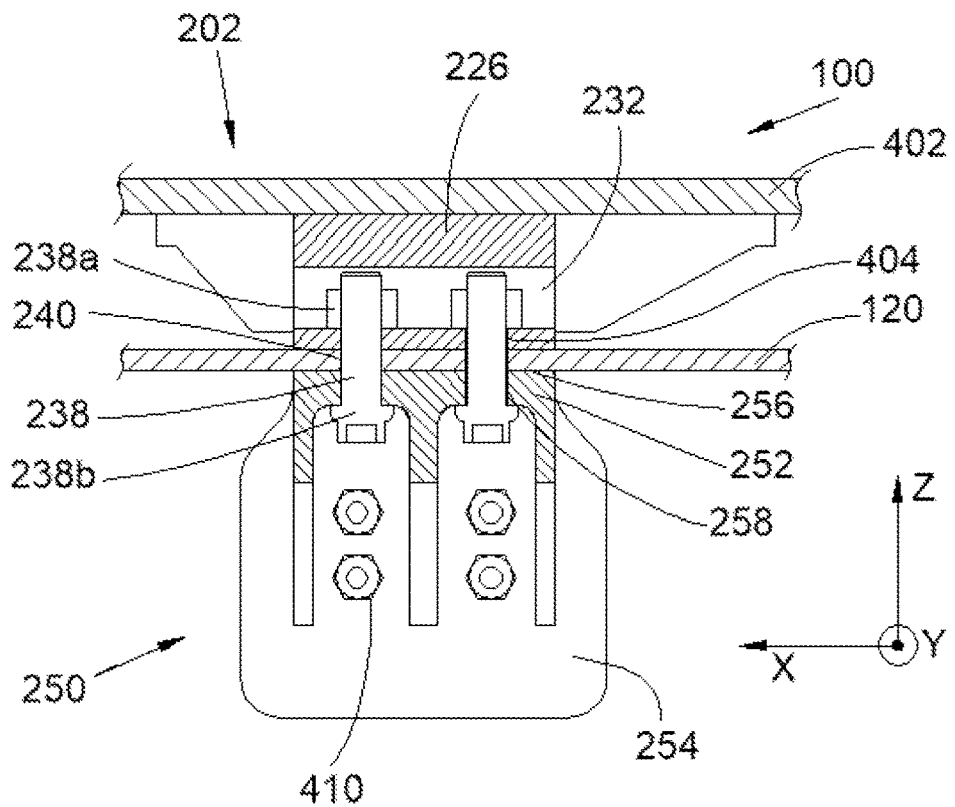
FIG. 4 shows a section on the plane IV of FIG. 2 of the assembly according to the invention.
Figure 5:
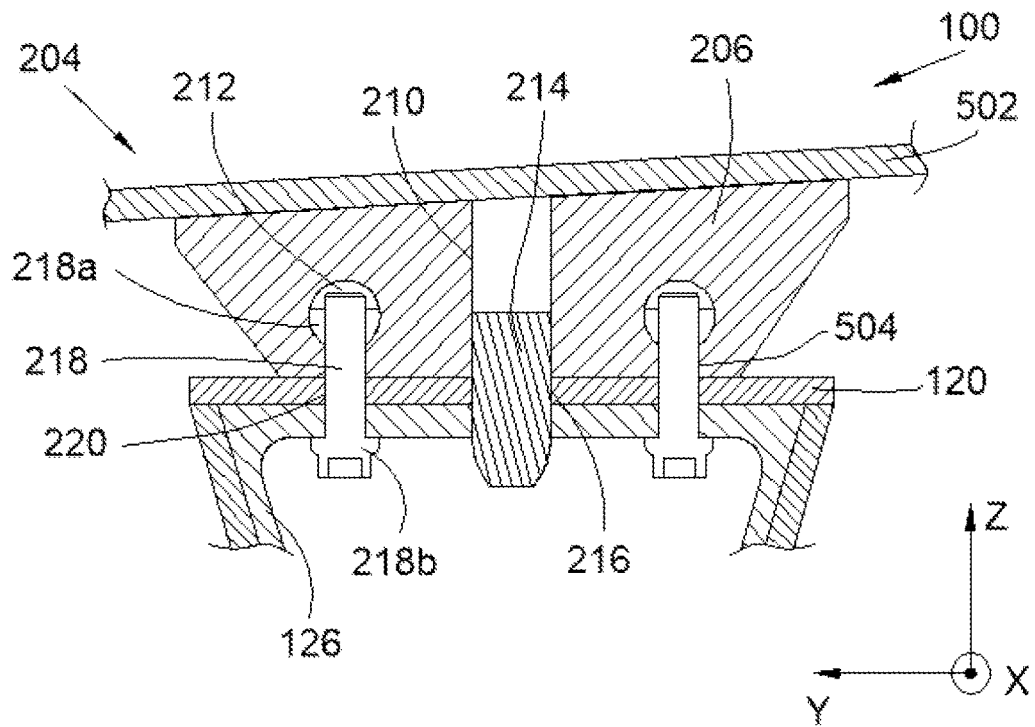
FIG. 5 shows a section on the plane V of FIG. 2 of the assembly according to the invention.

FIG. 4 and FIG. 5 show sections through the assembly 100 on the planes IV and V of FIG. 2.

The wing 102 comprises a wing box extending in a spanwise direction of the wing, and that forms the structure of the wing 102 around which the skin of the wing 102 forming the aerodynamic surface is fixed.

The wing box is conventionally formed by spars, in particular, lower spars 402 and 502 shown in FIG. 4 and FIG. 5. The wing box also comprises reinforcement ribs fixed between the spars and accommodated inside the wing box.

The assembly 100 also comprises the mounting pylon 110 that comprises a primary structure 112 in the form of a box, known as the primary box.

The primary structure 112, or rigid structure, allows the transmission to the wing box of the static and dynamic forces generated by the engine 150. The primary box forming the primary structure 112 extends in the longitudinal direction X. The primary box has a conventional design as is delimited, in particular, at the top, by an upper spar 120 and laterally by lateral panels 124 arranged symmetrically on either side of a median plane XZ perpendicular to the upper spar 120.

The upper spar 120 is located at least in part under the wing box.

Furthermore, the primary box forming the primary structure 112 is equipped with transverse reinforcement ribs, preferably arranged substantially in planes YZ and distributed in the longitudinal direction X. In particular, there is a transverse reinforcement rib closing the rear of the primary box, known as the rear closure rib 126.

The engine 150 is fixed to the primary box in a conventional manner, which will not be detailed within the context of this invention. It is achieved by means of conventional engine attachments known to a person skilled in the art.

The assembly 100 also comprises two fixing systems 202 and 204, namely a front fixing system 202 and a rear fixing system 204, which fix the mounting pylon 110 to the wing box and, more particularly, to the lower spars 402 and 502 of the wing 102.

The rear fixing system 204 comprises a rear beam 206 that is fixed to the lower spar 502 by fixing elements of the threaded-fastener element type, and for this purpose, the rear beam 206 is traversed by rear fixing bores 208 that allow the passage of the shanks of the fixing elements and are oriented vertically.

The rear beam 206 is pierced by a principal rear bore 210 that is also oriented vertically.

The rear beam 206 also comprises two secondary rear holes 212 that are oriented globally parallel to the longitudinal direction X and are arranged symmetrically on either side of the median plane XZ. From each secondary rear hole 212 there extends at least one rear through-passage 504 that is oriented vertically and opens out on the upper spar 120. Each rear through-passage 504 is, here, cylindrical.

The rear fixing system 204 also comprises an upper rear bore 216 that traverses the upper spar 120 of the mounting pylon 110 and is oriented vertically.

The upper rear bore 216 is coaxial with the principal rear bore 210.

In the embodiment of the invention presented here, the upper rear bore 216 also traverses the rear closure rib 126.

The rear fixing system 204 also comprises a rear shear pin 214 that is positioned in the upper rear bore 216 and in the principal rear bore 210. Thus, engine thrust and also Z-moment are taken up by the rear shear pin 214.

The rear fixing system 204 also comprises, for each rear through-passage 504, a secondary rear bore 220 that traverses the upper spar 120 of the mounting pylon 110 and is oriented vertically. Each secondary rear bore 220 is coaxial with the rear through-passage 504. In the embodiment of the invention presented here, each secondary rear bore 220 also traverses the rear closure rib 126.

The rear fixing system 204 also comprises, for each rear through-passage 504, a rear bolt 218 with a nut 218a accommodated in the secondary rear hole 212 and a screw 218b that traverses successively the secondary rear bore 220 and the rear through-passage 504 in order to be screwed into the nut 218a, sandwiching the upper spar 120, the rear beam 206 and the rear closure rib 126 where present.

In the embodiment of the invention presented here, each secondary rear hole 212 has a circular cross section and each nut 218a has a D profile.

In another embodiment, each secondary rear hole 212 may have a rectangular cross section and each nut 218a then has a conventional hexagonal or square profile.

The front fixing system 202 comprises a front beam 226 that is fixed to the lower spar 402 by fixing elements of the threaded-fastener element type, and for this purpose, the front beam 226 is traversed by front fixing bores 228 that allow the passage of the shanks of the fixing elements that are oriented vertically.

The front beam 226 is pierced with a principal front bore 230 that is also oriented vertically.

The front beam 226 also comprises two secondary front holes 232 that are oriented globally parallel to the longitudinal direction X and are arranged symmetrically on either side of a median plane XZ. From each secondary front hole 232 there extends at least one front through-passage 404, which, here, are two in number, where each front through-passage 404 is oriented vertically and opens out on the upper spar 120. Each front through-passage 404 is, here, cylindrical.

The front fixing system 202 also comprises an upper front bore 236 that traverses the upper spar 120 of the mounting pylon 110 and is oriented vertically.

The upper front bore 236 is coaxial with the principal front bore 230.

The front fixing system 202 also comprises a front shear pin 234 that is positioned in the upper front bore 236 and in the principal front bore 230. Thus, engine thrust and Z-moment are taken up by the front shear pin 234.

The front fixing system 202 also comprises, for each front through-passage 404, a secondary front bore 240 that traverses the upper spar 120 of the mounting pylon 110 and is oriented vertically. Each secondary front bore 240 is coaxial with the front through-passage 404.

The front fixing system 202 also comprises two brackets 250 arranged symmetrically on either side of the median plane XZ. Each bracket 250 comprises a base 252 and a blade 254 integral with the base 252.

The base 252 has an upper face 256 applied under the upper spar 120 and, for each front through-passage 404, the base 252 is pierced with a hole 258 that traverses same and is oriented vertically. Each hole 258 opens out at the upper face 256 and is coaxial with the front through-passage 404.

The blade 254 bears against and outside a lateral panel 124. The blade 254 is fixed to said lateral panel 124 by fixing elements of the threaded-fastener element type, and for this purpose, the blade 254 and the lateral panel 124 are traversed by bores that allow the passage of the shanks of the fixing elements and are oriented transversally perpendicularly to the lateral panel 124. The fixing elements are embodied, here, by the nuts 410 in FIG. 4 and sandwich the blade 254 and the lateral panel 124.

The rear fixing system 204 also comprises, for each front through-passage 404, a front bolt 238 with a nut 238a accommodated in the secondary front hole 232 and a screw 238b that traverses successively the hole 258, the secondary bore 240 and the front through-passage 404 in order to be screwed into the nut 238a, sandwiching the base 252, the upper spar 120 and the front beam 226.

In the embodiment of the invention presented here, each secondary front hole 232 has a circular cross section and each nut 238a has a D profile.

In another embodiment, each secondary front hole 232 may have a rectangular cross section and each nut 238a then has a conventional hexagonal or square profile.

Such a fitting with front 238 and rear 218 bolts arranged symmetrically relative to the median plane XZ further allows the use of mounting pylons 110 that are identical to port and to starboard of the aircraft 10.

FIG. 3 shows an assembly step that consists in fixing the two fixing systems 202 and 204 to the wing box with the shear pins 234 and 214 oriented downwards, in fixing the brackets 250 against the lateral panels 124 with the aid of fixing elements (410), then in raising the mounting pylon 110 in order to fit the front 238 and rear 218 bolts.

The front 238 and rear 218 bolts are thus accessible from the exterior, thus facilitating inspection on the ground and maintenance.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft, said assembly comprising:
a wing comprising lower spars,
a mounting pylon arranged under the wing and comprising a primary structure formed as a primary box having an upper spar and two lateral panels arranged symmetrically on either side of a median plane,
a front fixing system comprising:
a front beam fixed to the lower spar, wherein the front beam is pierced with a principal front bore oriented vertically, wherein the front beam is pierced with two secondary front holes oriented parallel to a longitudinal direction and arranged symmetrically on either side of the median plane, wherein from each secondary front hole there extends at least one front through-passage oriented vertically,
an upper front bore traversing the upper spar and oriented vertically and coaxial with the principal front bore,
a front shear pin positioned in the upper front bore and in the principal front bore, for the at least one front through-passage, a secondary front bore traversing the upper spar and oriented vertically and coaxial with the front through-passage, two brackets arranged symmetrically on either side of the median plane XZ, wherein each bracket comprises a base and a blade integral with the base, wherein the base has an upper face applied under the upper spar, wherein for the at least one front through-passage the base is pierced with a base hole traversing same and oriented vertically, and wherein each base hole opens out at the upper face and is coaxial with the front through-passage, wherein the blade is fixed against and on the outside of a lateral panel, and for the at least one front through-passage, a front bolt with a front bolt nut accommodated in the secondary front hole and a front bolt screw that successively traverses the secondary front hole, the secondary bore and the front through-passage in order to be screwed into the front bolt nut, and a rear fixing system comprising:

a rear beam fixed to the lower spar, wherein the rear beam is pierced with a principal rear bore oriented vertically, wherein the rear beam is pierced with two secondary rear holes oriented parallel to the longitudinal direction and arranged symmetrically on either side of the median plane, wherein from each secondary rear hole there extends at least one rear through-passage oriented vertically, an upper rear bore that traverses the upper spar and oriented vertically and coaxial with the principal rear bore, a rear shear pin positioned in the upper rear bore and in the principal rear bore, for the at least one rear through-passage, a secondary rear bore traversing the upper spar and oriented vertically and coaxial with the rear through-passage, for the at least one rear through-passage, a rear bolt with a rear bolt nut accommodated in the secondary rear hole and a rear bolt screw that traverses successively the secondary rear bore and the rear through-passage in order to be screwed into the rear bolt nut.

2. The assembly according to claim 1, wherein each secondary front hole has a circular cross section and each front bolt nut has a D profile.

3. The assembly according to claim 1, wherein each secondary rear hole has a circular cross section and each rear bolt nut has a D profile.

4. The assembly according to claim 1, wherein the primary structure comprises a rear closure rib, wherein each secondary rear bore traverses the rear closure rib, and wherein the upper rear bore traverses the rear closure rib.

5. An aircraft comprising at least one assembly according to claim 1.

* * * * *